United States Patent [19]

Morimoto

[11] Patent Number: 4,930,850
[45] Date of Patent: Jun. 5, 1990

[54] SCANNING OPTICAL SYSTEM FOR USE IN LASER BEAM PRINTER

[75] Inventor: Akira Morimoto, Tokyo, Japan

[73] Assignee: Asahi Kogaku Kogyo Kabushiki Kaisha, Tokyo, Japan

[21] Appl. No.: 267,892

[22] Filed: Nov. 7, 1988

[30] Foreign Application Priority Data

Nov. 6, 1987 [JP] Japan .................. 62-280809

[51] Int. Cl.$^5$ ............................................ G02B 26/10
[52] U.S. Cl. ...................................... 350/6.8; 350/6.5
[58] Field of Search .................. 350/6.8, 6.7, 6.91, 350/6.1, 479, 6.5; 250/236; 358/63, 199

[56] References Cited

U.S. PATENT DOCUMENTS

| | | | |
|---|---|---|---|
| 4,379,612 | 4/1983 | Matsuoka et al. | |
| 4,443,055 | 4/1984 | Matsuoka et al. | |
| 4,497,112 | 5/1984 | Matsuoka et al. | |
| 4,715,699 | 12/1987 | Morimoto | 350/6.8 |
| 4,756,583 | 7/1988 | Morimoto | 350/6.5 |
| 4,756,584 | 7/1988 | Takanashi | 350/6.8 |

FOREIGN PATENT DOCUMENTS

| | | |
|---|---|---|
| 0242120 | of 0000 | European Pat. Off. |
| WO81/02955 | 10/1981 | Fed. Rep. of Germany |
| 57-35823 | 2/1982 | Japan |
| 57-144514 | 9/1982 | Japan |
| 59-147316 | 8/1984 | Japan |

Primary Examiner—Rodney B. Bovernick
Assistant Examiner—Loha Ben
Attorney, Agent, or Firm—Sughrue, Mion, Zinn, Macpeak & Seas

[57] ABSTRACT

A scanning optical system for use in a laser beam printer which is small and available at low cost, and yet is capable of effectively compensating for tilting and beam shaping. The scanning lens unit in this optical system has two-element composition consisting of, in order from a deflector side, a first lens of a negative lens element having a concave spherical surface on the deflector side and a concave cylindrical surface oon the scanning surface side having a curvature in the auxiliary scanning cross section, and the second lens having a planar surface on the deflector side and a convex toric surface on the scanning surface side which has a stronger curvature in the auxiliary scanning cross section. The scanning lens unit has a shorter focal length in the auxiliary scanning cross section than in the main scanning direction and forms an image at a finite distance with the object point lying at focusing point where image is formed by the cylindrical lens. Thus, the scanning lens unit greatly reduces the effects of tilting of the deflector positioned between the focusing point and the scanning lens unit.

11 Claims, 4 Drawing Sheets

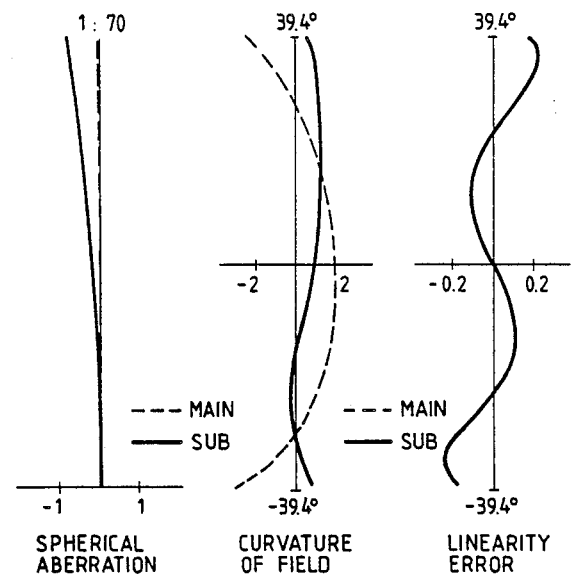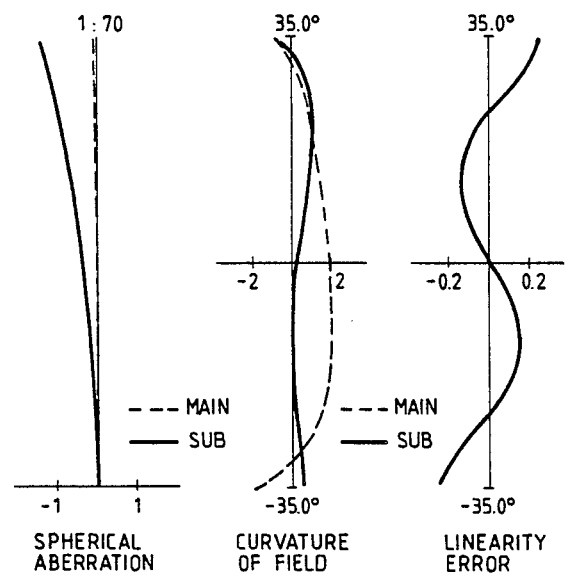

SCANNING OPTICAL SYSTEM FOR USE IN LASER BEAM PRINTER

BACKGROUND OF THE INVENTION

1. Field of the Invention

The present invention relates to an improved small-scale and low-cost optical scanning system for use in a laser beam printer which uses a semiconductor laser as a light source.

2. Description of the Prior Art

An optical scanning system for a laser beam printer consists basically of a light source section which issues a light beam, a deflector for deflecting the light beam, and a scanning lens unit which converges the deflected rays of light at a position proportional to the angle of deflection. A semiconductor laser which is small and directly tunable is commonly employed as the light source. Since light from a semiconductor laser is divergent, it is usually employed together with a collimator lens which collimates the laser beam. The angle of divergence of the laser light emitted from the semiconductor laser differs in two directions, i.e., a direction parallel to the junction plane of the laser (this direction is hereinafter referred to as a parallel direction) and a direction normal to the junction plane of the laser (which is hereunder referred to as a normal direction). Since the angle of divergence is larger in the normal direction than in the parallel direction, the diameter of the parallel beam obtained as a result of passage through the collimator lens is larger in the normal direction than in the parallel direction. As a consequence, the rays of light that are finally converged on a scanning surface by the scanning lens unit have an F number that is smaller in the normal direction, and the spot diameter, which is proportional to the F number of these rays of light, is larger in the parallel direction.

In order to solve this problem, the aperture diameter of the collimator lens has been made sufficiently small so that it blocks unwanted rays of light in the normal direction, thereby producing a beam spot having the same diameter in both parallel and normal directions, at the sacrifice of energy efficiency. An alternative approach has been to employ an anamorphic optical system such as a prism for the purpose of shaping the beam.

Another problem with conventional printers is that a deflector such as a rotating polygonal mirror causes unevenness in the pitch of scanning lines because of "tilting" which involves an error in a direction that is normal to the main scanning direction (which is hereunder referred to as an auxiliary scanning direction).

Two methods have been proposed for correcting this problem. One method consists of placing an anamorphic optical system in front of the deflector so that laser light is imaged on the deflecting plane, which is coincident with a cross section of the scanning optical system taken in the auxiliary scanning direction, with the scanning lens system also being made to have an anamorphic composition that allows laser light to be reimaged on the scanning surface, so that it is conjugative with the deflecting plane to eliminate adverse effects of tilting. The other method comprises using an anamorphic optical system and a scanning lens system in such a way that the focal distance and magnification in the auxiliary scanning direction are sufficiently reduced to minimize the unwanted effects of tilting.

The first method which involves linear imaging of laser light on the deflecting plane is vulnerable to flaws or dust particles on the deflecting plane. Furthermore, changes in the deflecting point of the rotating polygonal mirror cause such strong effects that it is difficult to maintain desired performance over the full range of the scanning width. The second method necessitates the use of a complex optical system in order to achieve the beam shaping. Furthermore, in order to compensate for the insufficient "tilting" correction, a high degree of dimensional precision is required of the rotating polygonal mirror, leading to increased production costs.

An fθ lens characterized by proportionality between the angle of incidence and the height of an image is commonly used in the scanning lens system for converting deflected rays of light on the scanning surface at a position proportional to the angle of deflection. However, in order to attain the proportionality (hereinafter referred to as linearity) between the incident angle and image height, the fθ lens has a strong negative distortion and requires that the error that might occur in this linearity be very small.

SUMMARY OF THE INVENTION

The present invention has been accomplished under the circumstances described above and it is an object of the present invention to provide a scanning optical system for use in a laser beam printer which is small and available at low cost, and yet is capable of effectively compensating for tilting and beam shaping.

The scanning lens unit in this optical system has two-group-two-element composition and, if it satisfies one of the three additional conditions, the size and cost of the scanning optical system can be reduced, and it is suitable for use in a laser beam printer thus assuring satisfactory performance.

BRIEF DESCRIPTION OF THE DRAWINGS

Embodiments of the present invention are described hereinafter with reference to the accompanying drawings.

FIGS. 4 to 7 are graphs plotting the aberration curves obtained in Examples 1 to 4, respectively, of the scanning lens unit.

DETAILED DESCRIPTION OF THE PREFERRED EMBODIMENTS

Figure 1A:
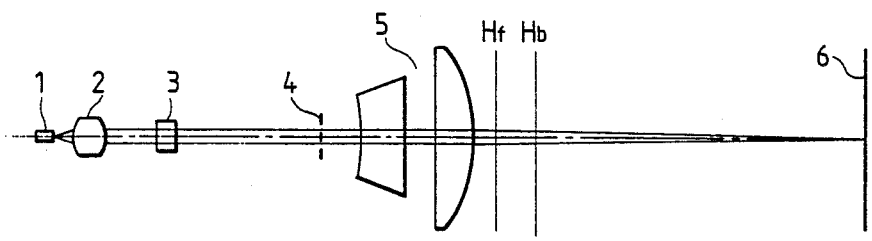
FIG. 1 is a general view showing the composition of a scanning optical system according to the present invention, with FIG. 1(a) showing its main scanning cross section, and FIG. 1(b) showing its auxiliary scanning cross section.
Figure 1B:
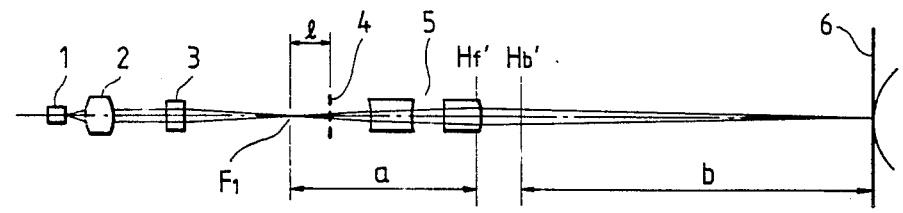

FIG. 1 shows a scanning optical system for use in a laser beam printer according to the present invention. FIG. 1(a) shows a cross section of this scanning optical system as taken in the main scanning direction (this is hereinafter referred to simply as a main scanning cross section), and FIG. 1(b) shows a cross section of the same scanning optical system taken in the auxiliary scanning direction (this is hereinafter referred to as an auxiliary scanning cross section).

The scanning optical system according to the first embodiment of the present invention comprises a semiconductor laser 1, a collimator lens 2 with which the laser light from the semiconductor laser 1 is converted to generally parallel rays of light, a cylindrical lens 3 that has a curvature in the auxiliary scanning cross section and which images the laser light in the auxiliary scanning cross section, a deflector 4 disposed behind a focusing position $F_1$ where the laser light is imaged in the auxiliary scanning cross section by means of the cylindrical lens 3, and an anamorphic scanning lens unit 5 which converges the rays of light that have been deflected with the deflector 4 on a scanning surface 6.

In FIG. 1, $H_f$ and $H_b$ denote front and back principal points in the main scanning cross section, and $H_f$ and $H_b$ signify front and back principal points in the auxiliary scanning cross section.

Figure 2:
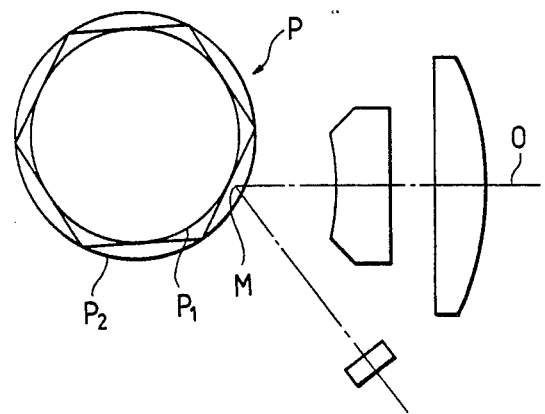
FIG. 2 is a layout of a polygonal mirror used as a deflector.

If a polygonal mirror P is to be used as deflector 4 in the scanning optical system described above, it should of course be disposed in such a way that the optical axis O is deflected along the line extending from the point of deflection M as shown in FIG. 2. The point of deflection M should lie on the optical axis between the inscribed circle $P_1$ and circumscribed circle $P_2$ of the polygonal mirror P.

Figure 3A:
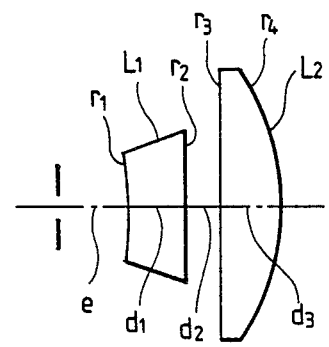
FIGS. 3(a) and 3(b) show diagrammatically the scanning lens unit in the optical system, with FIG. 3(a) showing a main scanning cross section and FIG. 3(b) showing an auxiliary scanning cross section.
Figure 3B:
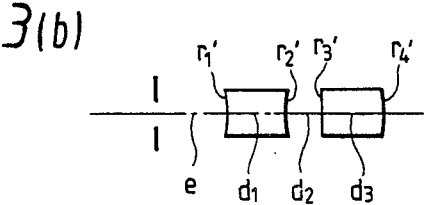
Figure 4:
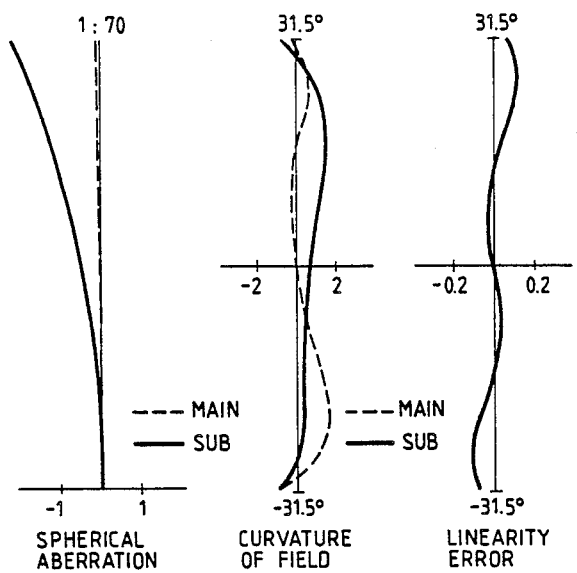
Figure 5:
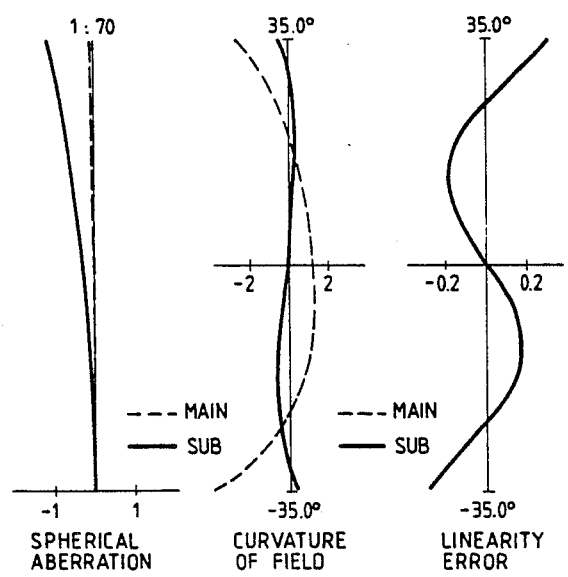

The composition of the scanning lens unit 5 used in the present invention is shown in FIGS. 3(a) and 3(b). It has a two-element composition consisting of, in order from a deflector side, the first lens $L_1$ composed of a negative lens element having a concave spherical surface on the deflector side and a concave cylindrical surface on the scanning surface side having a curvature in the auxiliary scanning cross section, and the second lens $L_2$ having a planar surface on the deflector side and a convex toric surface on the scanning surface side which has a stronger curvature in the auxiliary scanning cross section.

The scanning lens unit 5 has a shorter focal length in the auxiliary scanning cross section than in the main scanning direction and forms an image at a finite distance with the object point lying at focusing point $F_1$ where image is formed by the cylindrical lens 3. Because of this feature, the scanning lens unit 5 greatly reduces the effects of tilting of the deflector 4 positioned between the focusing point $F_1$ and the scanning lens unit 5.

If the focal length of the cylindrical lens 3 is adjusted so that the focusing point $F_1$ where an image is formed by the cylindrical lens 3 is in the auxiliary scanning cross section to be kept constant, the overall focal length in the auxiliary scanning direction can be altered, thereby changing the degree of beam shaping. Therefore, even if the shape of an incident laser beam changes on account of the elliptical ratio of a semiconductor laser or the NA of the collimator lens, optimal beam shaping can be accomplished to produce an imaging spot having a desired shape.

If the focusing point $F_1$ coincides with the deflector 4, a so-called conjugative system results and an infinite magnification of compensation is attained. However, the change in the point of deflection at a polygonal mirror or the error introduced during the machining of a difficult-to-work toric lens, can cause the conjugative point on the image plane to be shifted, which results in great variation in the efficiency of compensation for tilting.

Therefore, in order to avoid adverse effects of a shift in the conjugative point on the image plane that might be caused by errors in machining, the present invention requires that the focusing point $F_1$ be intentionally offset from the point of deflection.

An attendant advantage that results from this arrangement is that an incident beam falls on the deflecting surface over a certain area, rather than forming a line image, and hence is highly resistant to flaws or dust particles on the deflecting surface.

The first lens group $L_1$ in the scanning lens unit 5 has a negative power in the main scanning cross section, so it is able to compensate for the spherical aberration and coma that may be produced in the positive second lens group $L_2$. At the same time, the first lens group $L_1$ allows incident light to be transmitted into the second lens group $L_2$ at a position remote from the optical axis, thereby creating a negative distortion strong enough to improve the linearity between the incident angle and image height of the f$\theta$ lens.

The second lens group $L_2$ produces a strong negative distortion on its planar surface side and thus assures the necessary linearity for the F$\theta$ lens. At the same time, the positive power of the second lens group that occurs on its convex surface side enables the incident rays of light to be focused on the scanning surface 6.

The rays of light that are transmitted into the scanning lens unit 5 are divergent in the auxiliary scanning cross section, so the scanning lens unit 5 requires a stronger power in the auxiliary scanning cross section than in the main scanning cross section. The second lens group $L_2$ has a toric surface on the side of the scanning surface 6, which has a greater curvature in the auxiliary scanning cross section than in the main scanning cross section. As a result, it is capable of producing a great positive power. In addition, the power distribution between the toric surface and the negative cylindrical surface of the first lens group $L_1$ is such that any curvature of field that might occur in the auxiliary scanning direction can be efficiently compensated.

Another requirement that should be satisfied by the scanning optical system of the the present invention described above, in order to attain the intended results, is that it meet the following first condition:

$$0.015f < l < 0.15f \tag{1}$$

where $l$ is the distance from the focusing point $F_1$ in the auxiliary scanning cross section and the deflector, and f is the focal length of the scanning lens unit 5 in the main scanning cross section.

Even better results can be attained if one of the following three additional conditions are met. The second condition is:

$$2.2 < m < 3.2 \tag{2}$$

where m is the magnification of an image formed on the scanning surface 6 in the auxiliary scanning cross section by the scanning lens unit 5 as compared with the image formed on the focusing point $F_1$.

The magnification m is determined by the equation $m = b/a$ in which "a" signifies the distance from the focusing point $F_1$ to the front principal point $H_f$ of the scanning lens unit 5 in the auxiliary scanning cross section, and "b" denotes the distance from the back principal point $H_b$ of the scanning lens unit 5 to the focusing point on the scanning surface 6.

The third condition refers to the scanning lens unit 5 and is expressed by:

$$0.4 < \left| \frac{n_1 r_4'}{n_2 r_2'} \right| < 0.8 \tag{3}$$

where $n_1$ is the refractive index of the first lens group at an operating wavelength; $r_2'$ is the radius of curvature of the cylindrical surface in the auxiliary scanning cross section; $n_2$ is the refractive index of the second lens group; and $r_4'$ is the radius of curvature of the toric surface in the auxiliary scanning cross section.

The fourth condition also refers to the scanning lens unit 5 and is expressed by:

$$0.3f < |r_4| < 0.5f \tag{4}$$

where $r_4$ is the radius of curvature of the toric surface of the second lens group in the main scanning cross section, and f is the focal length of the scanning lens unit 5 in the main scanning cross section.

The first condition specifies the distance from the focusing point $F_1$ of an image formed by the cylindrical lens 3 to the deflecting plane. If l is smaller than the lower limit, the area of the image produced on the deflecting surface is reduced the thus becomes sensitive to surface flaws or dust particles. Furthermore, the effects of a change in the point of deflection become so large that there is a possibility that the desired performance cannot be guaranteed over the full range of scanning angles. If l exceeds the upper limit, the effectiveness in compensating for tilting is reduced, and it is possible that the pitch between scanning lines will become nonuniform.

The second condition specifies the magnification of an image formed on the scanning surface 6 in the auxiliary scanning cross section by the scanning lens unit 5 as compared with the image formed on the focusing point $F_1$. If m is smaller than the lower limit, the scanning lens unit 5 has to be brought closer to the scanning surface in order to attain the necessary magnification and this in turn will result in a bulky lens unit. Furthermore, the focal length in the auxiliary scanning direction becomes too short to accomplish satisfactory beam shaping. If m is greater than the upper limit, the effectiveness in compensating for tilting is reduced and the effects of a change in the point of deflection may become unduly great on the scanning surface 6.

The third condition refers to the balance that should be attained in the auxiliary scanning cross section between the concave cylindrical surface of the first lens group and the convex toric surface of the second lens group. If $|n_1 r_4'/n_2 r_2'|$ is greater than the upper limit, the negative power of the concave cylindrical surface becomes relatively excessive, and the amount of incident light on the convex toric lens of the second lens group is increased as compared with its curvature, thereby causing a disturbed wavefront aberration. If $|n_1 r_4'/n_2 r_2'|$ is smaller than the lower limit, the negative action of the concave cylindrical surface becomes too weak to effectively compensate for the undercompensated marginal curvature of field in auxiliary scanning.

The fourth condition specifies the curvature of the toric surface of the second lens group in the main scanning cross section. If $r_4$ is smaller than the lower limit, a small system can be realized, but on the other hand, great coma will occur in the main scanning cross section and a desired spot cannot be obtained. If $r_4$ is greater than the upper limit, the second lens group has to be brought closer to the scanning surface in order to maintain the power of the overall system, and this contributes to the increase in the size of the lens unit.

The scanning lens unit employed in the system of the present invention does not necessarily have a high refractive index for the toric lens in the second lens group, so an inexpensive optical material can be used to reduce the production cost by satisfying the condition $n_2 < 1.7$, where $n_2$ is the refractive index of the second lens group.

Preferred examples of the scanning lens unit 5 which is part of the scanning optical system of the present invention are described below, in which: $r_i$ is the radius of curvature of an "ith" surface in the main scanning cross section as counted from the deflector side; $r_i'$ is the radius of curvature of the ith surface in the auxiliary scanning cross-section; $d_i$ is the thickness or aerial distance of an "ith" lens; $n_k$ is the refractive index of a "kth" lens group at an operating wavelength; "e" is the distance between the point of deflection M and the first surface; l is the distance between the focusing point $F_1$ and the point of deflection M in the auxiliary scanning cross section; b is the distance between the back principal point of the scanning lens unit and the focusing point on the scanning surface; and f is the focal length in the main scanning direction, and all dimensions are in millimeters.

Example 1
$r_1 = -105.7$  $r'_1 = -105.7$  $d_1 = 24.252$  $n_1 = 1.51072$
$r_2 = \infty$  $r'_2 = 34.3$  $d_2 = 15.348$
$r_3 = \infty$  $r'_3 = \infty$  $d_3 = 17.243$  $n_2 = 1.60910$
$r_4 = -74.496$  $r'_4 = -24.9$
$f = 199.664$  $fb = 240.4$  $e = 12.189$
$l = 0.04f$
$m = 2.94$  $\left| \frac{n_1 r_4'}{n_2 r_2'} \right| = 0.68$
$|r_4| = 0.37f$ Example 2
$r_1 = -163.54$  $r'_1 = -163.54$  $d_1 = 18.284$  $n_1 = 1.51072$
$r_2 = \infty$  $r'_2 = 33.65$  $d_2 = 12.641$
$r_3 = \infty$  $r'_3 = \infty$  $d_3 = 20.199$  $n_2 = 1.60910$
$r_4 = -78.262$  $r'_4 = -24.0$
$f = 179.647$  $fb = 199.2$  $e = 16.737$
$l = 0.06f$
$m = 2.41$  $\left| \frac{n_1 r_4'}{n_2 r_2'} \right| = 0.67$
$|r_4| = 0.44f$ Example 3
$r_1 = -159.814$  $r'_1 = -159.814$  $d_1 = 20.268$  $n_1 = 1.51072$
$r_2 = \infty$  $r'_2 = 39.75$  $d_2 = 9.328$
$r_3 = \infty$  $r'_3 = \infty$  $d_3 = 17.929$  $n_2 = 1.67496$
$r_4 = -79.303$  $r'_4 = -24.34$
$f = 160.638$  $fb = 175.56$  $e = 15.86$
$l = 0.05f$
$m = 2.47$  $\left| \frac{n_1 r_4'}{n_2 r_2'} \right| = 0.55$
$|r_4| = 0.49f$ Example 4
$r_1 = -161.328$  $r'_1 = -161.328$  $d_1 = 19.42$  $n_1 = 1.59321$
$r_2 = \infty$  $r'_2 = 33.43$  $d_2 = 12.02$
$r_3 = \infty$  $r'_3 = \infty$  $d_3 = 21.422$  $n_2 = 1.63552$
$r_4 = -78.312$  $r'_4 = -23.67$
$f = 180.132$  $fb = 202.97$  $e = 16.825$
$l = 0.02f$
$m = 2.67$  $\left| \frac{n_1 r_4'}{n_2 r_2'} \right| = 0.69$
$|r_4| = 0.44f$ As described above, the present invention which satisfies the first condition provides a scanning optical system that is very effective in compensating for tilting and in beam shaping, and yet is resistant to flaws or dust particles on the deflecting surface.

The scanning lens unit in this optical system has two-element composition and if it satisfies one of the three additional conditions specified herein, the size and cost of the scanning optical system can be reduced, and it is suitable for use in a laser beam printer thus assuring satisfactory performance.

What is claimed is:

1. A scanning optical system for use in a laser printer comprising:
   a semiconductor laser;
   a collimator lens receiving laser light from said semiconductor laser and emitting substantially parallel light rays;
   a cylindrical lens having a curvature in a cross section taken in a first direction normal to a main scan direction, said cylindrical lens receiving said parallel light rays emitted by said collimator lens and images said laser light at a focusing point in said cross section taken in said first direction;
   a deflector which deflects light rays transmitted by said cylindrical lens, said deflector being disposed on an opposite side of said focusing point in said cross section taken in said first direction; and
   an anamorphic scanning lens unit which converges light rays deflected by said deflector at a point on a scanning surface;
   wherein said anamorphic scanning lens unit has a two-element composition comprising, in order from a side nearest said deflector;
   a first lens having a negative lens element with a concave spherical surface on a side facing said deflector and a concave cylindrical surface on a side facing said scanning surface, said concave cylindrical surface having a curvature in said cross section taken in said first direction, and
   a second lens having a planar surface on a side facing said deflector and a convex toric surface on a side facing said scanning surface, said convex toric surface having a stronger curvature in said cross section taken in said first direction.

2. A scanning optical system for use in a laser printer as claimed in claim 1, wherein said scanning optical system further satisfies the following condition:

$$2.2 < m < 3.2,$$

where m is the magnification of an image formed on said scanning surface in said cross section taken in said first direction by said scanning lens unit as compared to an image formed by said cylindrical lens.

3. A scanning optical system for use in a laser printer as claimed in claim 2, wherein m is determined by the following equation:

$$m = b/a,$$

where a is the distance between said focusing point and a front principal point of said scanning lens unit in said cross section taken in said first direction, and b is the distance between a back principal point of said scanning lens unit in said cross section taken in said first direction and said point on said scanning surface.

4. A scanning optical system for use in a laser printer as claimed in claim 1, wherein said deflector is a polygonal mirror.

5. A scanning optical system for use in a laser printer as claimed in claim 2, wherein the refractive index of said second lens is less than 1.7.

6. A scanning optical system for use in a laser printer as claimed in claim 1, wherein said scanning optical system further satisfies the following condition:

$$0.4 < |n_1 r_4'/n_2 r_2'| < 0.8,$$

where $n_1$ is the refractive index of said first lens at an operating wavelength; $r_2'$ is the radius of curvature of said cylindrical surface of said negative lens element of said first lens in said cross section taken in said first direction; $n_2$ is the refractive index of said second lens and $r_4'$ is the radius of curvature of said toric surface in said cross section taken in said first direction.

7. A scanning optical system for use in a laser printer as claimed in claim 6, wherein the refractive index of said second lens is less than 1.7.

8. A scanning optical system for use in a laser printer as claimed in claim 1, wherein said scanning optical system further satisfies the following condition:

$$0.3f < |r_4| < 0.5f,$$

where $r_4$ is the radius of curvature of said toric surface of said second lens in said cross section taken in said main scan direction, and f is a focal length of said scanning lens unit in said cross section taken in said main scan direction.

9. A scanning optical system for use in a laser printer as claimed in claim 8, wherein the refractive index of said second lens is less than 1.7.

10. A scanning optical system for use in a laser printer as claimed in claim 1, wherein said optical system satisfies the following condition:

$$0.015f < l < 0.15f$$

where f is a focal length of said scanning lens unit in the main scanning cross section, and l is a distance between said focusing point in said cross section taken in said first direction and a point of deflection of said deflector.

11. A scanning optical system for use in a laser printer comprising:
    a semiconductor laser;
    first means for focussing the light from said laser onto a focussing point in a first dimension while leaving the light unfocussed in a second dimension normal to said first dimension;
    a deflector which deflects light rays transmitted by said first means, said deflector being disposed on an opposite side of said focusing point from said first means; and
    an anamorphic scanning lens unit which converges light rays deflected by said deflector at a point on a scanning surface;
    wherein said anamorphic scanning lens unit has a two-element composition comprising, in order from a side nearest said deflector:
    a first lens having a negative lens element with a concave spherical surface on a side facing said deflector and a concave cylindrical surface on a side facing said scanning surface, said concave cylindrical surface having a curvature in a cross section taken in a direction normal to said first dimension; and
    a second lens having a planar surface on a side facing said deflector and a convex toric surface on a side facing said scanning surface, said convex toric surface having a stronger curvature in said cross section taken in said direction normal to said first dimension.

* * * * *